Oct. 18, 1927.
C. A. SCHMIDT
1,645,723
VEHICLE BUMPER
Filed March 28, 1927  2 Sheets-Sheet 1
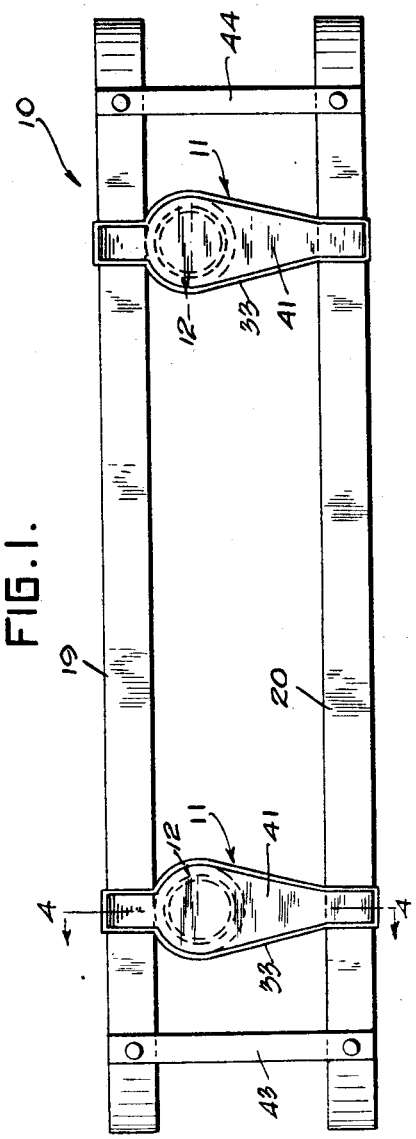
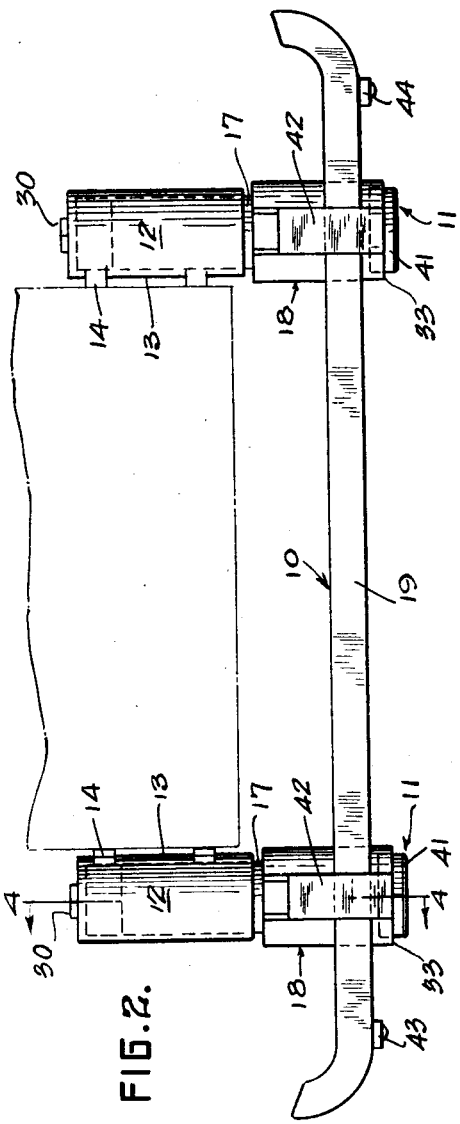
INVENTOR.
Carlos A. Schmidt
BY M. C. Frank
ATTORNEY.

Oct. 18, 1927.  
C. A. SCHMIDT  
VEHICLE BUMPER  
Filed March 28, 1927  
1,645,723  
2 Sheets-Sheet 2
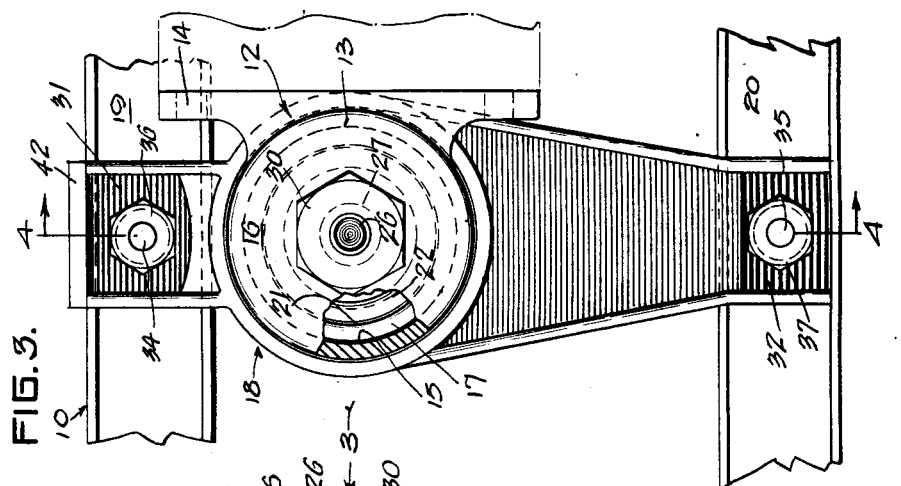
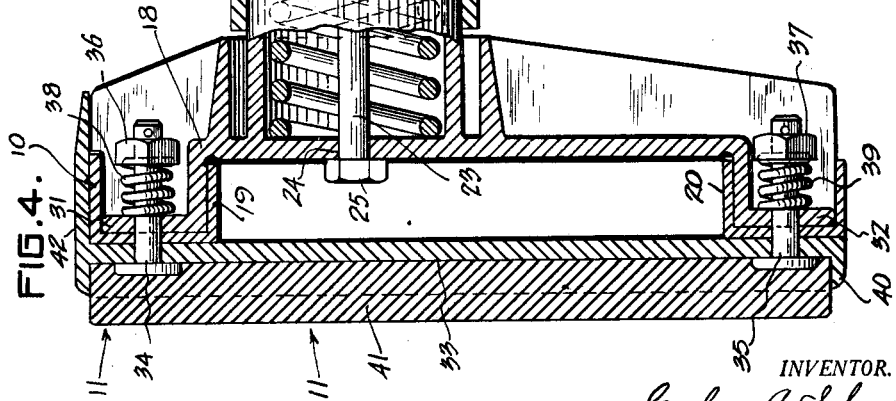
INVENTOR.  
Carlos A. Schmidt  
BY M. C. Frank  
ATTORNEY.

Patented Oct. 18, 1927.

1,645,723

UNITED STATES PATENT OFFICE.

CARLOS A. SCHMIDT, OF OAKLAND, CALIFORNIA.

VEHICLE BUMPER.

Application filed March 23, 1927. Serial No. 178,905.

This invention relates to improvements in vehicle bumpers and especially to that class of automobile bumpers having auxiliary shock absorbing means. The present construction comprises, in addition to its flexible impact section, auxiliary protective means adapted to receive and absorb severe shocks which may be transmitted to the impact section thereof and which shocks would ordinarily cause considerable damage to or breakage of a bumper of ordinary construction.

The only protective means ordinarily found in common bumper construction is the inherent flexible qualities of the impact section which is so constructed as to receive the full force of shocks transmitted to the impact section by moving or stationary objects, while in the present construction the bumper impact section is provided with protective means in the form of elastic buffers, and the bumper as a whole is carried by auxiliary shock absorbing members so constructed and positioned as to "take up" the more severe shocks transmitted to the impact section of the bumper.

This construction not only insures the vehicle against injury but also performs the double function of absorbing shocks and at the same time is itself protected against breakage.

The object of my invention is to provide a comparatively cheap bumper of the class designated which embodies in its construction, elastic protective buffer means and auxiliary shock absorbing means so designed and arranged as to cooperate in preventing damage to the vehicle upon which it is mounted.

Another object of my invention is to provide a bumper of the class designated that may be used as either a front or rear bumper for the ordinary motor vehicle.

Another object of the invention is to provide a bumper which is strong, durable and neat in appearance.

Additional to the foregoing objects is the provision of a bumper having incorporated in its construction means for preventing rattling of the various parts when assembled.

Other objects and advantages of my invention will be apparent with reference to the subjoined specification and accompanying two sheets of drawings in which:

Figure 1 is a front elevation showing the preferred embodiment of my invention and which consists of an impact section having spaced impact bars and provided intermediate its ends with a pair of frontal elastic buffers as shown;

Figure 2 is a plan view showing the bumper as a whole and including the elastic buffers and rearwardly arranged shock absorbing members which members are borne by the side frames of the vehicle body;

Figure 3 is a considerably enlarged rear end view showing one of the shock absorbing members of the bumper and its mounting means; and Figure 4 is an enlarged sectional view taken on the line 4—4 of Figure 3 and showing the interior construction and arrangement of parts of one of the shock absorbing members and also showing the method of mounting the same upon the bumper impact section the bars of which are shown in transverse section.

Referring with greater particularity to the drawings, the numeral 10 designates the bumper in general and which is provided with spaced frontal buffers 11 and rearwardly positioned shock absorbing members 12, said shock absorbing members also providing supporting means for the bumper and for its attachment to the frame of the vehicle (not shown).

The shock absorbing members 12 are identical in construction and each consist of a cylinder 13 having means 14 adapting it for attachment to the side of the vehicle frame.

The cylinders 13 are each provided with a finished bore 15, closed rear end 16 and open front end and are adapted to receive plunger members 17 which are integrally formed with the supporting members 18, said members 18 being in turn bolted to the impact bars 19 and 20 of the bumper 10, as hereinafter described.

The inner ends of the plungers 17 are open and as a whole form spring housings 21 and their outer ends are closed by the upright walls of the supporting members 18.

Compression springs 22 are positioned within the housings 21 and their outer extremities bear against the closed ends of the said housings 21 and their inner extremities bear against the rear ends of the cylinders 13, as shown in Figure 4.

The means for holding the cylinders 13 and the plungers 17 in telescoped relation and for adjusting the compression springs 22, consist of bolts 23 which project through openings 24 formed in the members 18, said bolts having heads 25 at their outer ends and threaded inner extremities 26. Adjusting members 27 having threaded bores 28, adapted to receive the threaded extremities 26 of the bolts, are revolubly mounted in openings 29 formed in the cylinder ends 16 and are provided at their outer ends with hexagon heads 30 adapted for engagement by a wrench or like tool to properly adjust the tension upon the springs 22.

The members 18 are provided with outwardly projecting lugs 31 and 32 having their outer faces disposed in a common plane and adapted to fit snugly within the channel impact bar sections 19 and 20, as shown in Figure 4.

The front buffers 11 are mounted in frames 33 which frames are secured in position against the outside faces of the impact bar sections 19 and 20 and in opposed relation to the members 18, and said frames 33, impact bar sections 19 and 20, and the lugs 31 and 32 are perforated to receive retaining bolts 34 and 35. These bolts 34 and 35 are provided with nuts 36 and 37 and coil springs 38 and 39, which springs are interposed between the nuts 36 and 37 and the lugs 31 and 32 of the members 18, the said coil springs 38 and 39 tending to firmly hold the several parts in rigid relationship and to prevent rattling thereof.

The frames 33 may be of any desired configuration, but are preferably shaped as shown in Figures 1 and 3 and comprise elongated retaining members having outwardly projecting flanges 40 forming means for embracing the resilient buffer members 11 which buffers preferably consist of rubber pads 41.

The upper ends of the frames 33 are provided with inwardly projecting lugs 42 adapted to rest upon the upper surface of the impact bar 19 of the bumper, as shown in Figures 2, 3, and 4, and provide means for the rigid bracing of both impact sections of the bumper. Additional bracing strips 43 and 44 are provided to brace the extremities of the bars 19 and 20 as shown in Figures 1 and 2.

It will be observed that a bumper constructed in accordance with this invention provides means in the form of the buffer members which are adapted to absorb slight shocks occasioned by the bumper coming into contact with any moving or stationary object and additional means is provided for absorbing the more violent shocks in the form of auxiliary shock absorbing members adapted to "take up" heavy shocks which may be transmitted thereto by the buffer members, or the bumper as a whole.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States the following:

1. A bumper for motor vehicles comprising, an impact section consisting of spaced impact bars, elastic buffer members mounted upon the front sides of said impact bars, and yielding shock absorbing members rearwardly of said buffer members and consisting of telescopic members having spring means normally held under compression.

2. A bumper for motor vehicles comprising, an impact section consisting of spaced impact bars, elastic buffer members carried frontally thereof, shock absorbing members mounted rearwardly thereof and consisting of telescopic members, and spring means interposed between said telescopic members and tending to hold one of said members in yielding relationship to the other.
3. A bumper for motor vehicles having means for its attachment to the frame of a vehicle and comprising, an impact section consisting of spaced impact bars, elastic buffer members mounted frontally of said impact bars, shock absorbing members mounted rearwardly of said buffer members, spring means interposed between said members and adjustable means carried by said telescopic members for limiting the movement of one of said telescopic members relative to the other.

4. A bumper for motor vehicles having means for its attachment to the frame of a vehicle and comprising, an impact section, spaced frames mounted frontally of said impact sections, elastic buffer members mounted in said frames, shock absorbing members mounted rearwardly of said buffer members and consisting of rigidly mounted cylinders having plungers therein, means connecting said plungers to the impact section of the bumper, and spring means interposed between said cylinders and plungers and tending to urge said plungers outwardly relative to said cylinders.

5. A bumper for motor vehicles having means for its attachment to the frame of a vehicle and comprising, an impact section, spaced frames mounted frontally of said impact sections, elastic buffer members mounted in said frames, shock absorbing members mounted rearwardly of said buffer members and consisting of rigidly mounted cylinders having plungers therein, means connecting said plungers to the impact section of the bumper, spring means interposed between said cylinders and plungers and tending to urge said plungers outwardly relative to said cylinders, and means for limiting the outward movement of said plungers.

6. A bumper for motor vehicles having means for its attachment to the frame of a vehicle and comprising, an impact section, spaced frames mounted frontally of said impact sections, elastic buffer members mounted in said frames, shock absorbing members mounted rearwardly of said buffer members and consisting of rigidly mounted cylinders having plungers therein, means connecting said plungers to the impact section of the bumper, spring means interposed between said cylinders and plungers and tending to urge said plungers outwardly relative to said cylinders, means for limiting the outward movement of said plungers, and yielding means for securing the buffer members and shock absorbing members to the impact section of the bumper.

In testimony whereof, I affix my signature.

CARLOS A. SCHMIDT.